J. E. BELL.
APPARATUS FOR FEEDING PULVERIZED FUEL.
APPLICATION FILED JULY 29, 1914.

1,184,303.

Patented May 23, 1916.

WITNESSES

INVENTOR
Jno. E. Bell,

J. E. BELL.
APPARATUS FOR FEEDING PULVERIZED FUEL.
APPLICATION FILED JULY 29, 1914.

1,184,303.  Patented May 23, 1916.
5 SHEETS—SHEET 5.

WITNESSES  INVENTOR

UNITED STATES PATENT OFFICE.

JOHN E. BELL, OF NEW YORK, N. Y.

APPARATUS FOR FEEDING PULVERIZED FUEL.

1,184,303.

Specification of Letters Patent.

Patented May 23, 1916.

Application filed July 29, 1914. Serial No. 853,827.

*To all whom it may concern:*

Be it known that I, JOHN E. BELL, a citizen of the United States, residing at New York, in the county of New York and State of New York, have invented a new and useful Improvement in Apparatus for Feeding Pulverized Fuel, of which the following is a full, clear, and exact description, reference being had to the accompanying drawings, forming part of this specification, in which—

Figure 1:
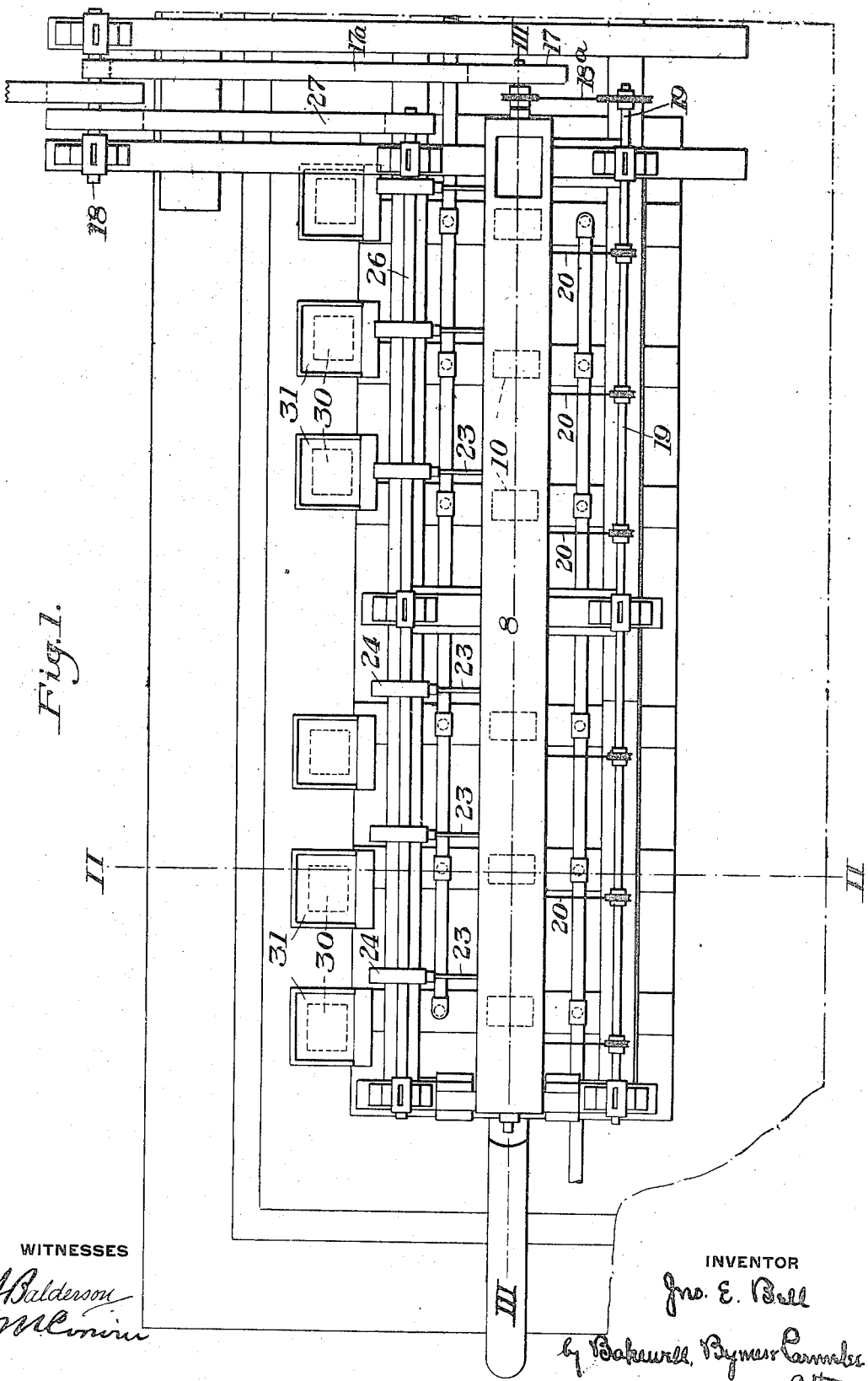
Figure 2:
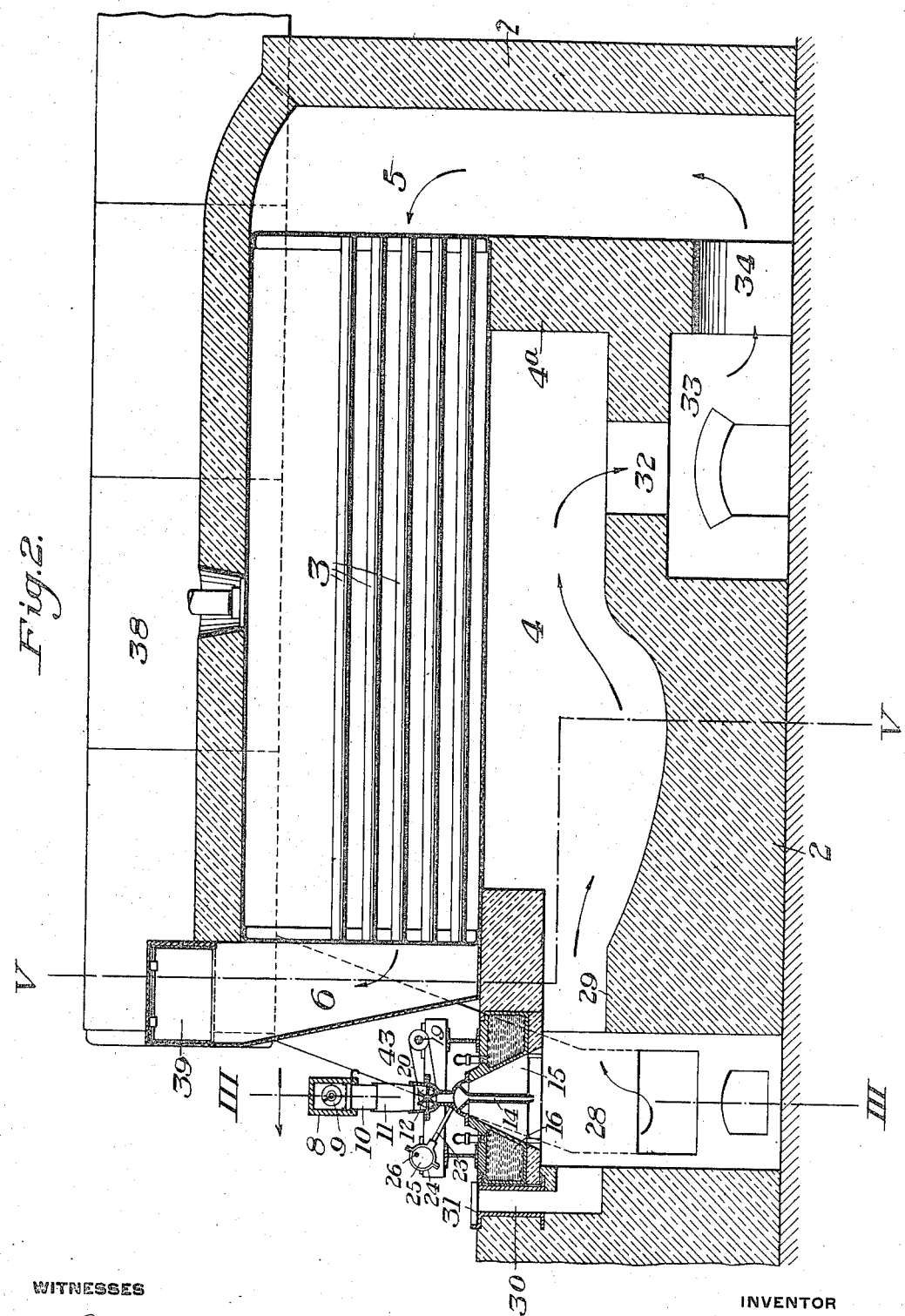
Figure 3:
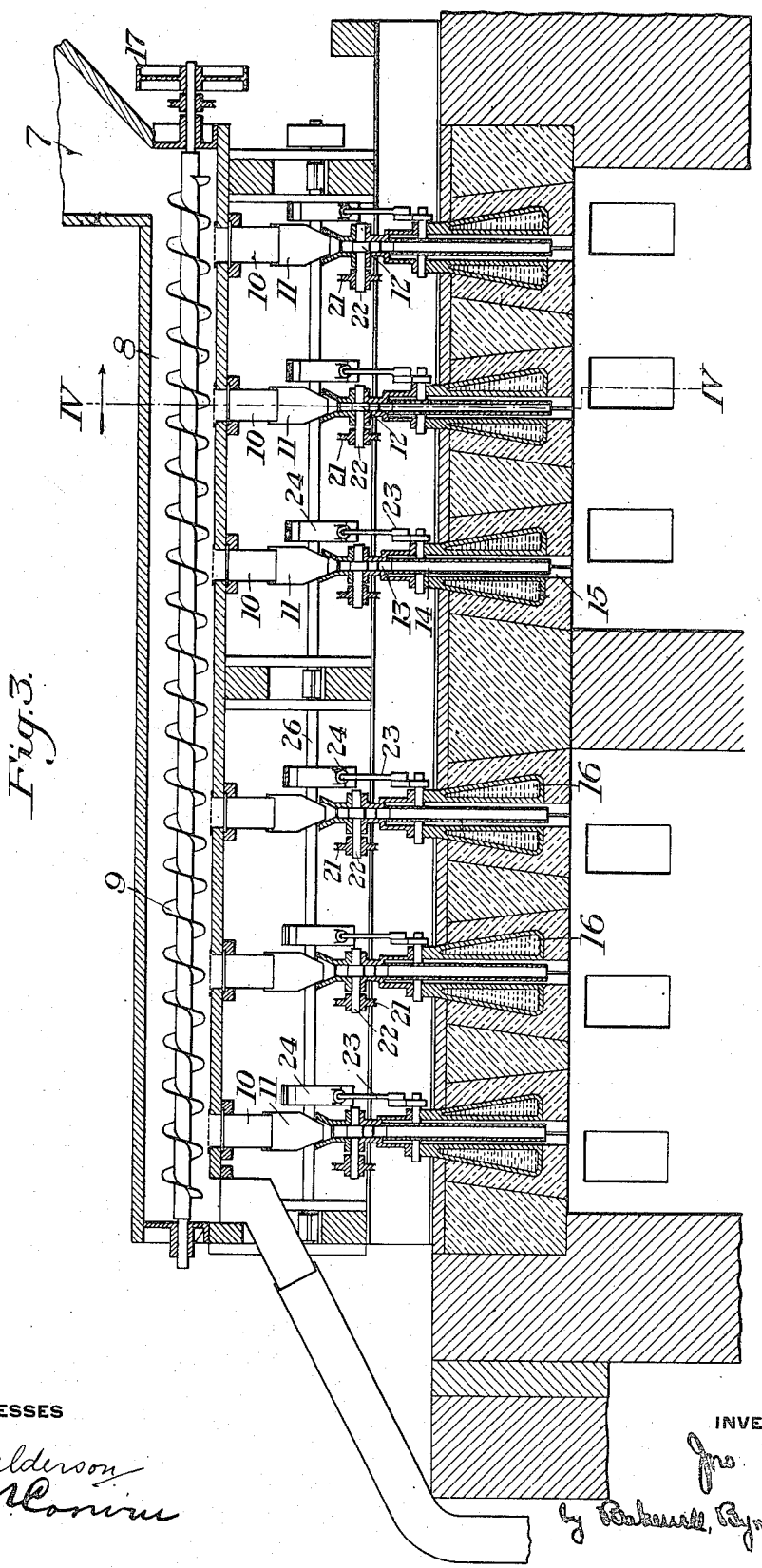
Figure 4:
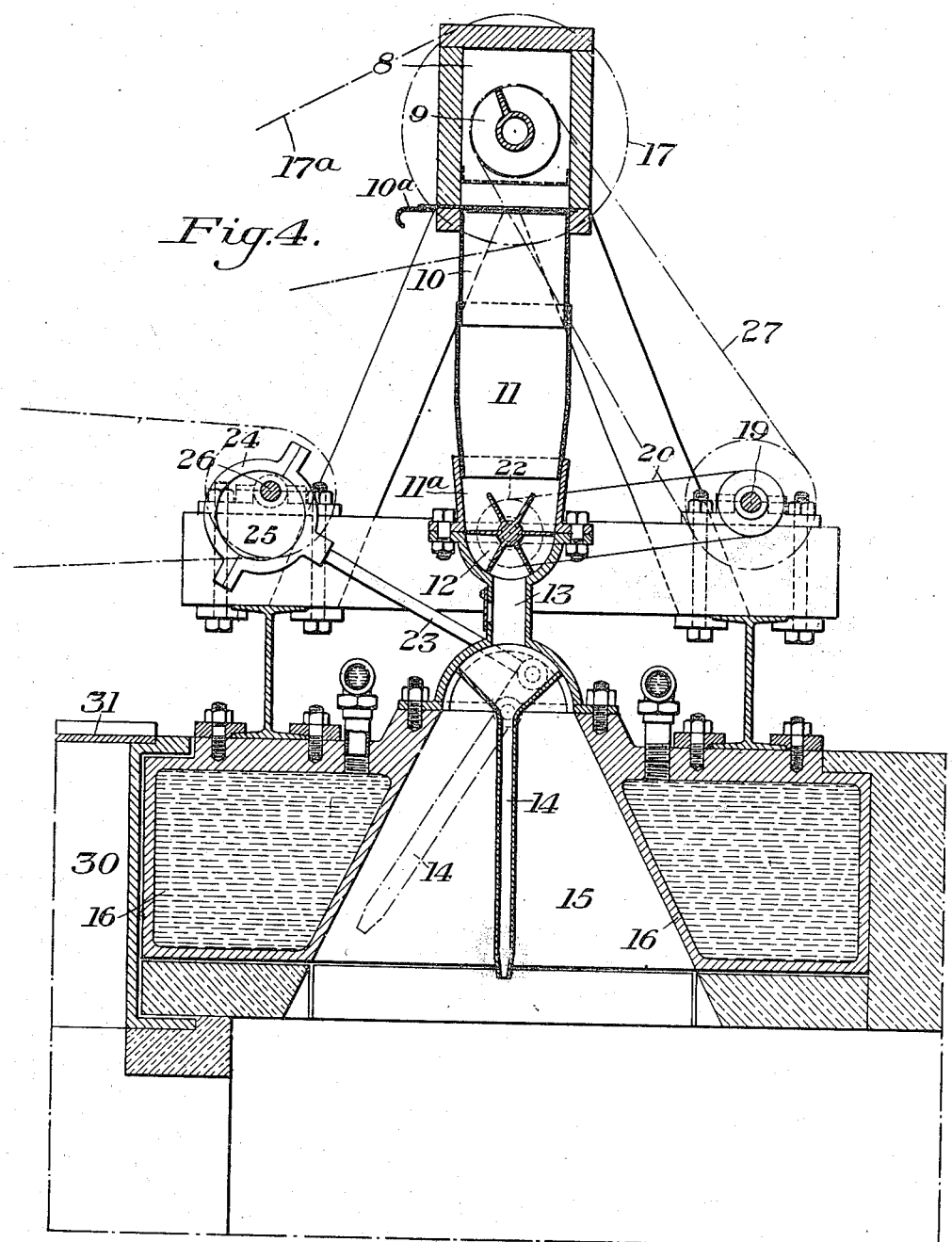
Figure 5:
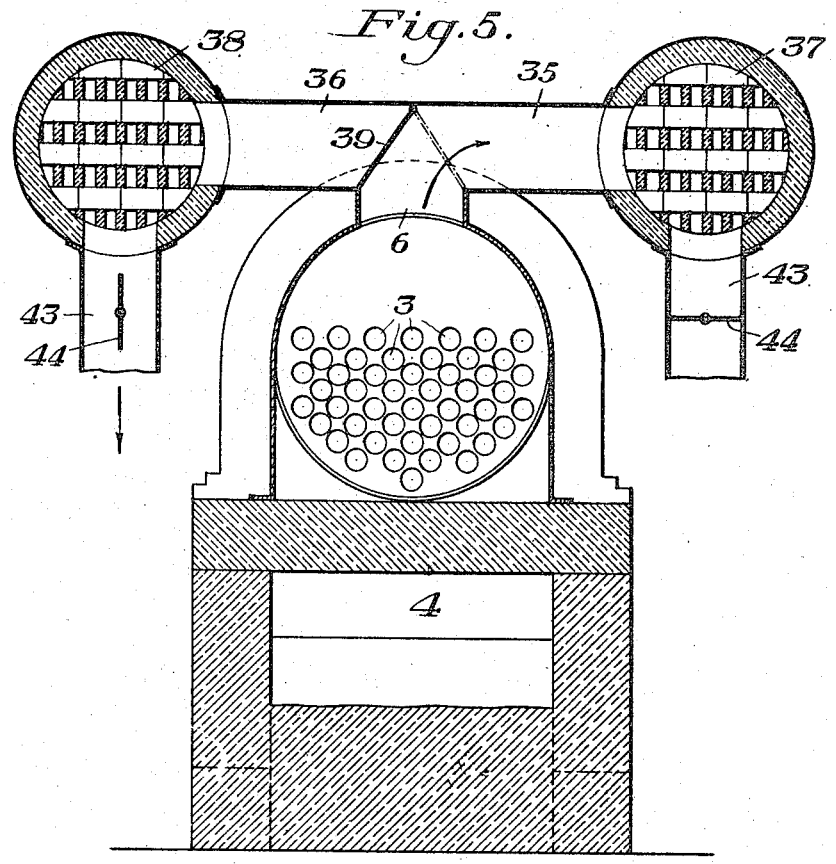
Figure 6:
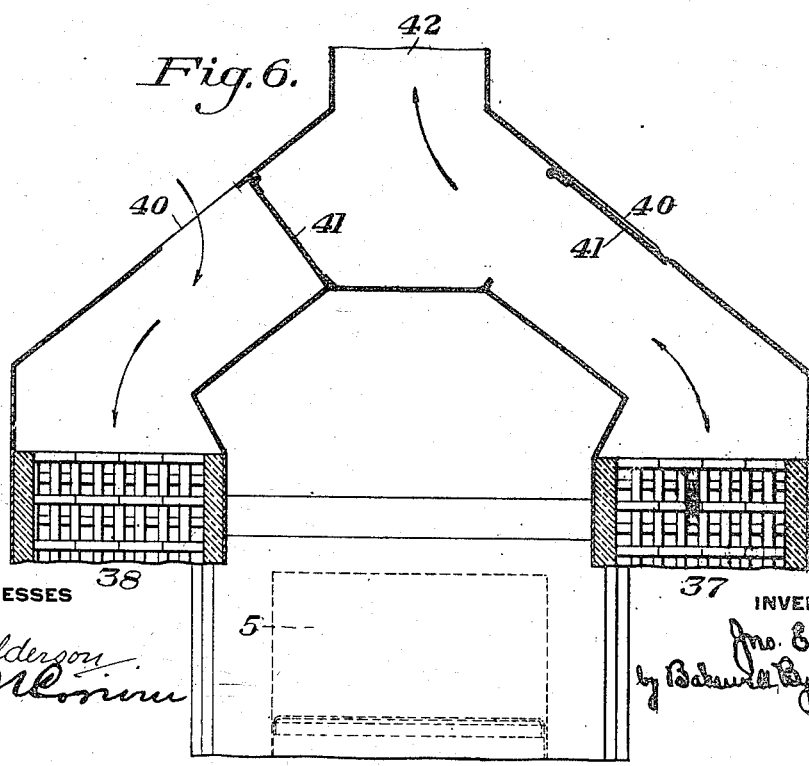

Figure 1 is a plan view of a portion of a furnace structure embodying my invention; Fig. 2 is a longitudinal vertical section taken, for instance, on the line II—II of Fig. 1; Fig. 3 is a transverse vertical section taken on the line III—III of Figs. 1 and 2; Fig. 4 is a vertical section taken through one of the feeders on the line IV—IV of Fig. 3; Fig. 5 is a section on the irregular line V—V of Fig. 2; and Fig. 6 is a sectional plan view of a portion of the structure.

The object of my invention is to provide apparatus for feeding pulverized fuel which will deliver the particles of fuel in such a manner as to cause them to be thoroughly mixed with air before they pass into the combustion chamber. I also preferably provide regenerator means for furnishing a supply of preheated air for mixing with the fuel delivered by the feeding apparatus and whereby the spent products of combustion may be utilized for preheating this air.

While I have shown my invention as applied to a boiler furnace, and more particularly to a boiler of the return tubular type, my invention is not limited in its application to any particular type of furnace, but is applicable to various types of boiler furnaces, to gas producers and open hearth furnaces, and in fact, wherever it is desired to use pulverized fuel.

In the accompanying drawings, the numeral 2 designates the wall of the furnace structure; and 3 the flues which extend above the combustion chamber 4, and open at one end into the vertical chamber 5 and at the opposite end into an offtake 6.

The numeral 7 designates a hopper into which the granulated or pulverized fuel may be fed, this hopper opening at the bottom into a feeding chamber 8, which extends transversely across the front of the furnace in front of the offtake 6.

9 is a screw conveyer working in the chamber 8, and adapted to feed the fuel longitudinally therethrough. The bottom of the chamber 8 is provided at intervals with discharge spouts 10, each of which is arranged to discharge into a fixed hopper 11, and having a fuel-measuring device 12, working therein.

The portion 11ª of the hopper 11, in which the measuring device works, has a contracted discharge opening 13, which is arranged to deliver the fuel into the funnel-shaped portion of an oscillating hopper and distributer 14. This oscillating distributer is arranged to work within the downwardly enlarged opening 15 of a water-cooled member 16, set within the wall of the furnace structure. The shaft of the conveyer 9 may be driven in any suitable manner. It is shown as having a pulley 17, connected by a belt 17ª with a driving shaft 18. The conveyer shaft has a driving connection at 18ª with a shaft 19, from which a series of driving connections 20 extend to pulleys 21 on the ends of the shafts 22 of the fuel measuring devices 12. The oscillating fuel distributers 14 may also be actuated in any suitable manner, as by the rods 23, each of which is connected to one of said distributers and also to the strap 24 of an eccentric 25. A series of these eccentrics is placed on the shaft 26, which is also shown as being driven by a belt 27, from the driving shaft 18. The distributers 14 are arranged to discharge the fuel as they oscillate into a mixing chamber 28, which communicates with the combustion chamber 4 over the bridge wall 29.

30 designates a series of vent openings normally closed by the explosion caps 31. Each of the discharge chutes 10 may be provided with a regulating valve 10ª, shown in Fig. 4. The bottom wall of the combustion chamber 4 has one or more openings 32, extending therethrough and leading into a secondary chamber 33. The opening 32 forms what I term a vortex mixer. The chamber 33 communicates by one or more openings 34 with the chamber 5, into which the rear ends of the flues 3 open.

The offtake pipe 6 has the two branches 35 and 36, leading, respectively, to the regenerators 37 and 38. 39 is a valve for controlling the flow of gases from the offtake to these regenerators, (see Fig. 5). Each regenerator has an air inlet opening 40, controlled by a valve 41. These valves may be so arranged, as shown in Fig. 6, that when either one is open to admit air to the regenerator, it closes the outlet from the regenerator to the stack passage 42. Each regenerator also has a connection 43, leading into the mixing chamber 28, and provided with a controlling valve 44.

The operation is as follows: The fuel is fed into the mixing chamber 28 in the front extension of the furnace in the manner before described. The air supply coming in to this chamber from one of the regenerators through the connection 43, rises and meets the stream of granulated fuel with which it mixes and passes out over the bridge wall 29, into the combustion chamber 4. The lower portion of the chamber 28, below the bridge wall 29, forms a space for catching any heavier particles of fuel which may fall through the current of air. The combustion chamber 4 includes the space which is ordinarily included between the grates and the water-heating surface. In accordance with my invention, however, no grates are used. The burning fuel, after ignition, may pass to water-heating surfaces in any suitable manner. In the particular structure shown, the space at the rear end of the combustion chamber is entirely closed off by the bridge wall 4$^a$, and the gases and unconsumed fuel are compelled to pass downwardly through the opening or openings 32 in the floor of said chamber. The opening or openings being of restricted cross section, a high velocity of the gases will take place in passing through such opening or openings, this resulting in a very complete mixture of the air, fuel and gases, the action being in the nature of a vortex. For this purpose, the furnace may be used with a strong draft.

The gases of combustion being thoroughly intermingled in passing through the opening or openings, all inflammable matter contained therein will be consumed in the secondary combustion chamber 33. From this secondary combustion chamber the gases pass through the boiler in the regular way, and thence to the regenerators 37 and 38. These regenerators may consist of cylinders lined with firebrick and built of checkerwork. The gases of combustion from the boiler pass through one of the regenerators, while the air for combustion comes in through the other, a reversal of the flow taking place at suitable intervals and in the usual way by means of the valve or dampers. From the regenerator, the gases pass to the stack or induced draft end of the furnace.

By feeding the coal in the manner described through the oscillating distributer spouts, the feed is largely by gravity assisted by the centrifugal force produced by the oscillation of the spouts. This method of feeding gives a uniform distribution of the fuel throughout the chamber 28, assuring a much better mixture than can be obtained by stationary feeders. This distribution is also greatly facilitated by dropping the fuel into an ascending current of air.

The extensive experiments and investigations which I have conducted show that perfect combustion of pulverized or granulated fuel is very largely a question of mechanical mixture. My experiments show that a hot gas acts very much in the nature of an extremely viscous fluid, and that it has very little tendency to a mixing action. It is therefore important that some means be provided for effecting a mechanical mixture.

My object is consequently to distribute the coal supply throughout the air supply in such a manner that each particle of the fuel is surrounded as nearly as possible by the air required for its combustion.

The provision of the eddy or vortex mixer as above described insures to a still greater degree the obtaining of a very high degree of combustion. My invention is not, however, dependent upon the use of the eddy flow through the vortex mixer and, in fact, can be efficiently operated without this feature.

Features of my invention not claimed herein are in the subject matter of my divisional application, Serial No. 32,540, filed June 7, 1915.

I claim:

1. Apparatus for feeding pulverized or granulated fuel, comprising a mixing chamber, a spout pivoted to oscillate in a vertical plane at the upper portion of the mixing chamber, means for delivering pulverized or granular fuel thereto, means for oscillating the spout to deliver the particles into the mixing chamber, and means for supplying an upwardly and laterally moving current of air into which the fuel particles are discharged from said spout, substantially as described.

2. Apparatus for feeding pulverized or granulated fuel, comprising a furnace structure having a combustion chamber and a mixing chamber in advance of the combustion chamber, an oscillating fuel delivery member mounted to swing in a vertical plane and discharge into the mixing chamber, and means for maintaining a moving body of air into which the fuel particles are discharged and by which they are carried into the combustion chamber, substantially as described.

3. Apparatus for feeding pulverized or granulated fuel, comprising a furnace structure having a combustion chamber and a mixing chamber in advance of the combustion chamber, an oscillating fuel delivery member mounted to swing in a vertical plane and discharge into the mixing chamber, and means for maintaining a moving body of air into which the fuel particles are discharged and by which they are carried, together with means for preheating the air, substantially as described.

4. Apparatus for feeding pulverized or granulated fuel, comprising a feeder for the fuel having a plurality of discharge openings, a mixing chamber below the feeder and which communicates with a combustion chamber, an oscillating fuel distributer below each discharge opening of the feeder, and arranged to discharge into the mixing chamber, and means for providing a moving body of air into which the fuel is discharged by the distributers and by which it is carried into the combustion chamber, substantially as described.

In testimony whereof, I have hereunto set my hand.

JOHN E. BELL.

Witnesses:
JESSE B. HELLER,
H. M. CORWIN.